United States Patent [19]

Hattori

[11] Patent Number: 4,493,402
[45] Date of Patent: Jan. 15, 1985

[54] HYDRAULIC TORQUE CONVERTER FOR VEHICLES

[75] Inventor: Torao Hattori, Wako, Japan

[73] Assignee: Honda Giken Kogyo Kabushiki Kaisha, Tokyo, Japan

[21] Appl. No.: 350,347

[22] Filed: Feb. 19, 1982

[30] Foreign Application Priority Data

Jun. 5, 1981 [JP] Japan .................. 56-86607

[51] Int. Cl.³ .............................. B60K 41/28
[52] U.S. Cl. .................. 192/326; 192/0.052; 192/48.92
[58] Field of Search ............ 192/3.21, 3.22, 3.25, 192/3.26, 3.27, 3.28, 3.29, 3.3, 3.31, 3.57, 0.092, 0.077, 0.076, 0.052, 48.92; 74/733

[56] References Cited

U.S. PATENT DOCUMENTS 3,693,478 9/1972 Malloy .................. 192/3.3
4,041,701 8/1977 Goto et al. .............. 192/3.3
4,252,031 2/1981 Nishimura et al. ......... 192/113 B

FOREIGN PATENT DOCUMENTS 649586 1/1951 United Kingdom .......... 192/3.31

Primary Examiner—George H. Krizmanich
Assistant Examiner—M. Manley
Attorney, Agent, or Firm—Armstrong, Nikaido, Marmelstein & Kubovcik

[57] ABSTRACT

A hydraulic torque converter which comprises a pump wheel having an engine output shaft coupled thereto, and a turbine wheel having a turbine output shaft connected thereto, wherein the turbine wheel is coupled to the pump wheel through a fluid coupling for the transmission of power therebetween. A one-way clutch and an on-off clutch are connected in series, the serially connected clutches being connected between the pump wheel and the turbine wheel. When the on-off clutch is engaged and the one-way clutch is engaged, the turbine wheel is mechanically coupled to the pump wheel for the transmission of power thereto.

6 Claims, 2 Drawing Figures

HYDRAULIC TORQUE CONVERTER FOR VEHICLES

BACKGROUND OF THE INVENTION

1. Field of the Invention

This invention relates to a hydraulic torque converter for vehicles in which the pump wheel and the turbine wheel are connected through a one-way clutch and an on-off clutch, arranged in series with each other.

2. Description of the Prior Art

A direct coupling device of a fluid torque converter for vehicles such as automobiles has been used to increase the torque transmission efficiency by directly connecting the pump wheel and the turbine wheel to minimize the slippage between these elements with no fluid working as a transmission medium. This kind of conventional direct coupling device has a friction clutch interposed between the pump and turbine wheels, which is engaged or disengaged by hydraulic pressure or centrifugal force. When engaged, the friction clutch connects the pump and turbine wheels thereby shifting the power transmission mode from fluid transmission to mechanical transmission. The conventional direct coupling device, however, has a drawback. That is, since during the mechanical transmission no slippage of the friction clutch is permitted, when the fluid torque converter is directly coupled the variation in engine torque will be conveyed directly to the power transmission system. Thus, when the vehicle is abruptly decelerated, a resulting shock is conveyed to the power transmission system giving an uncomfortable feeling to the driver. In this way, although the conventional direct coupling device improves the transmission efficiency, it has the drawback of reducing comfort during driving.

SUMMARY OF THE INVENTION

An object of this invention is to provide a hydraulic torque converter for vehicles which, in the clutch engagement region, performs power transmission from the engine to the drive wheel, i.e., from the pump wheel to the turbine wheel by means of mechanical coupling and which, during deceleration or driving by inertia, automatically changes the power transmission mode from mechanical transmission to fluid transmission, thereby ensuring fuel saving and more economical driving than the conventional device and reducing the shock to the transmission system that may result from deceleration.

To achieve this objective, an improved hydraulic torque converter is proposed, which comprises a pump wheel connected to the engine output shaft; a turbine wheel connected to the drive wheel; and a one-way clutch and an on-off clutch arranged in series with each other and interposed between the pump wheel and the turbine wheel. The pump and turbine wheels are thereby connected through the one-way clutch and the on-off clutch in such a manner that when the on-off clutch is engaged, the power is transmitted only from the pump wheel to the turbine wheel via the one-way clutch, while a reverse load from the turbine wheel to the pump wheel is transmitted through the fluid.

The above and other objects, features and advantages of the present invention will become apparent from the following detailed description of the invention when taken in conjunction with the accompanying drawings which illustrate a preferred embodiment of the invention.

DETAILED DESCRIPTION OF THE PREFERRED EMBODIMENT

Figure 1:
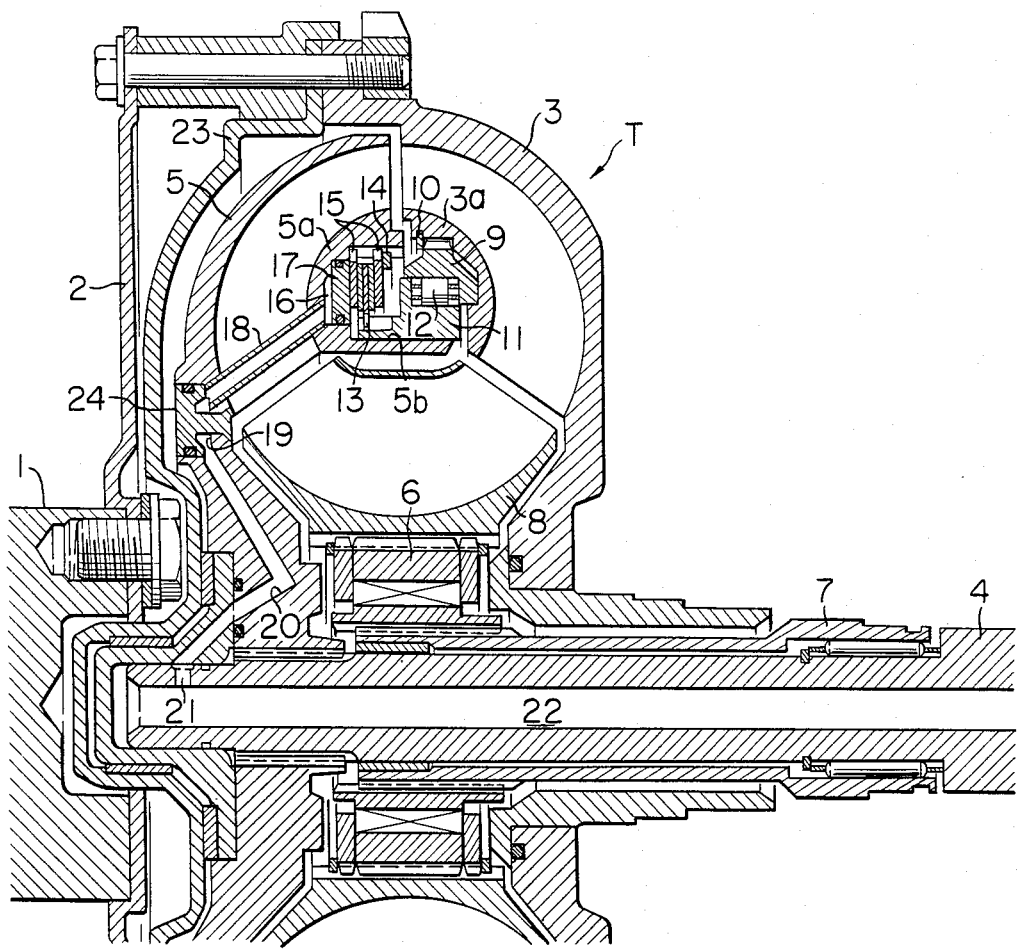
FIG. 1 is a vertical cross-sectional view of a hydraulic torque converter of the present invention.
Figure 2:
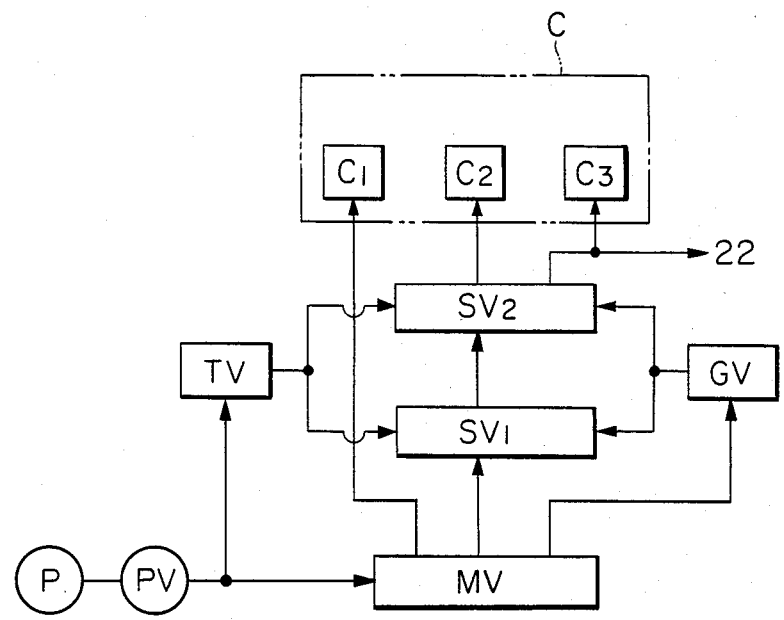
FIG. 2 is a schematic hydraulic circuit diagram of a speed changer.

One embodiment of this invention will now be explained with reference to the attached drawings. Referring to FIG. 1, a hydraulic torque converter T of this invention for vehicles consists of a pump wheel 3 connected through a drive plate 2 to an engine output shaft 1. A turbine wheel 5 is coupled to a turbine shaft 4 and a stator 8 is coupled to a stator shaft 7 through a one-way clutch 6. The turbine shaft 4 is connected to a driving wheel (not shown) through a speed changing device C (FIG. 2).

Between the pump wheel 3 and the turbine wheel 5, an on-off clutch and a one-way clutch are provided in series with each other. The on-off clutch is made up of a multiple plate friction clutch which is actuated by hydraulic pressure. The one-way clutch can only transmit power from the pump wheel 3 to the turbine wheel 5 when the on-off clutch is engaged. In the following we will explain the construction of these clutches.

The pump wheel 3 has an annular drive member 9 splined to its inner wall 3a and kept in position by a snap ring 10 at one end of the drive member 9. A driven member 11 is rotatably supported on the cylindrical supporting surface 5b which is formed integral with the inner wall 5a of the turbine wheel 5. Inserted between the drive and driven members 9 and 11 is a wedge roller 12 which transmits a rotating force only from the drive member 9 to the driven member 11. The drive member 9, the driven member 11 and the wedge roller 12 make up the one-way clutch.

The on-off clutch is made up of drive friction plates 13 splined to the driven member 11, driven friction plates 15 and an annular piston 17. The driven friction plates 15 are splined to that portion of the inner wall 5a of the turbine wheel 5 opposite to the cylindrical supporting surface 5b, with the drive friction plates 13 and the driven friction plates 15 arranged alternately so that they overlap each other. The driven friction plates 15 are kept in position by a snap ring 14. The annular piston 17 is fitted axially slidably into a hydraulic chamber 16 formed in the turbine wheel 5, adjacent to the driven friction plates 15. As the pressurized oil is introduced into the hydraulic chamber 16, the piston 17 is pushed toward the right in FIG. 1 bringing the drive and driven friction plates 13, 15 into frictional engagement.

It is also possible to secure the drive friction plates 13 to the driven member 11 and spline the driven friction plates 15 slidably to the inner wall 5a of the rotor 5.

The hydraulic chamber 16 is connected with an oil pipe 18, a communicating groove 19 and an oil passage 20 provided in the rotor 5 and an oil passage 21 radially extending through the turbine shaft 4 to communicate with an oil passage 22 running axially through the turbine shaft 4.

The torque converter has a cover 23 and a plug 24 to close the communicating groove 19 formed in the turbine wheel 5.

Now referring to FIG. 2, the hydraulic circuitry of the speed changing device C as well as the hydraulic torque converter T are shown. The delivery side of the hydraulic pump P is connected to a hydraulic pressure control valve PV and then to a manual valve MV. The manual valve MV is connected to a low-speed clutch C1 of the speed changer C for controlling the action of the low-speed transmission system. The manual valve MV is also connected, through first and second shift valves SV1 and SV2 connected in series, to an intermediate-speed clutch C2 for controlling the action of the intermediate-speed transmission system. The second shift valve SV2 is connected to a high-speed clutch C3 for controlling the action of the high-speed transmission system and also to an axial oil passage 22 in the turbine shaft 4. The first and second shift valves SV1 and SV2 are shifted between the first and second positions by a first hydraulic pressure generator TV and a second hydraulic pressure generator GV. The first hydraulic pressure generator TV is connected to the oil path between the hydraulic pressure control valve PV and the manual valve MV to generate an oil pressure according to the opening of the throttle valve. The second hydraulic generator GV is connected to the manual valve MV to produce an oil pressure corresponding to the vehicle speed.

When the first shift valve SV1 is in the first position, the communication of the manual valve MV with the intermediate-speed clutch C2 is shut off. With the first shift valve SV1 in the second position and the second shift valve SV2 in the first position, the intermediate-speed clutch C2 is connected to the manual valve MV. When both the first and second shift valves SV1, SV2 are in the second position, the manual valve MV is communicating with both the high-speed clutch C3 and the axial oil passage 22 in the turbine shaft 4. Thus, by operating the manual valve MV it is possible to actuate the low-, intermediate- and high-speed clutches and thereby operate the low-, intermediate- and high-speed transmission systems to perform speed changing. When the high-speed clutch C3 is actuated, the hydraulic pressure is also supplied to the axial oil passage 22 in the turbine 4, with the resulting increase in pressure in the hydraulic chamber 16. This in turn causes the piston 17 to be pushed toward the right in FIG. 1 bringing the drive and driven friction plates 13 and 15 into frictional engagement. In this condition the on-off clutch is engaged.

Now, the action of this embodiment will be explained. As the engine output shaft 1 is driven, the pump wheel 3 coupled to the output shaft 1 is rotated. The rotation of the pump wheel 3 forces through the medium of the fluid between the pump and turbine wheels 3, 5, the turbine wheel 5 and the turbine shaft 4 to rotate. The stator wheel 8 increases the torque in the speed-change region of the hydraulic torque converter T while idling in the clutch engagement region relative to the pump wheel 3 and the turbine wheel 5.

In the speed-change region of the torque converter T, the axial oil passage 22 in the turbine shaft 4 is not supplied with the hydraulic pressure, so that the pressure in the hydraulic chamber 16 of the on-off clutch is low with the on-off clutch being disengaged. Thus, the power transmission between the pump wheel 3 and the turbine wheel 5 is performed only through the fluid.

Now, if the high-speed clutch C3 of the speed changer C is actuated, the hydraulic pressure is also supplied to the axial oil passage 22 in the turbine shaft 4. from which oil pressure is applied to the radial oil passage 21, the oil passage 20, the communicating groove 19, the oil pipe 18 and to the hydraulic chamber 16. With the pressure established in the hydraulic chamber 16, the piston 17 is slid towards the right in FIG. 1 pressing the drive and driven friction plates 13, 15 against each other to thereby engage the on-off clutch. The pump and turbine wheels 3 and 5 are connected directly through the one-way clutch.

In this condition, when the vehicle is abruptly decelerated or is run by its inertia, a reverse load is applied to the turbine shaft 4 and the rotating speed of the driven member 11 becomes greater than that of the drive member 9. The drive and driven members 9, 11 then become free to rotate with respect to each other, automatically shifting the mechanical power transmission into the hydraulic power transmission from the turbine wheel 5 to the pump wheel 3.

In the above embodiment, the supply and discharge of hydraulic pressure to and from the hydraulic chamber of the on-off clutch is controlled in connection with the vehicle speed and the opening of the throttle valve, as shown in FIG. 2. However, it may be possible to relate the supply and discharge of hydraulic pressure only to the vehicle speed, for example. It is also possible to connect the hydraulic chamber 16 of the on-off clutch, through a valve, to an oil passage supplying hydraulic pressure to the speed changing elements such as the speed-changing clutches C1, C2, C3 of the speed changer C, and to control the opening and closing of the valve in connection with the vehicle speed.

Furthermore, instead of being interposed between the pump and turbine wheels 3 and 5 as shown, the one-way clutch and the on-off clutch may be arranged in series with the engine output shaft 1 and the turbine shaft 4 to directly connect the engine output shaft 1 and the turbine shaft 4 through these clutches.

According to the present invention as described above, there is proposed a fluid torque converter for vehicles which includes a pump wheel connected to an engine output shaft and a turbine wheel connected to a drive wheel wherein power transmission between the pump and turbine wheels is usually performed by the medium of the fluid provided therebetween. The pump wheel and turbine wheel are further coupled together through a one-way clutch and a on-off clutch arranged in series so that when the on-off clutch is engaged, the power is transmitted only from the pump wheel to the turbine wheel through the one-way clutch and the transmission of a reverse load from the turbine wheel to the pump wheel is through the fluid only. With this arrangement in the on-off clutch engagement region, the engine power is transmitted from the pump wheel to the turbine wheel, thus, increasing the transmission efficiency. When the vehicle is abruptly decelerated or when it is run by its intertia, the one-way clutch idles to automatically prevent the mechanical transmission of a reverse load from the turbine wheel to the pump wheel and shifts the transmission mode to the fluid transmission so as to mitigate and absorb the shock resulting from sharp deceleration. At the same time, this prevents the engine from being forced by the reverse load to run at high speed thus saving fuel and ensuring an economic traveling of the vehicle.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A hydraulic torque converter comprising:
   (a) a pump wheel having an engine output shaft coupled thereto;
   (b) a turbine wheel having a turbine output shaft connected thereto, wherein said turbine wheel is coupled to said pump wheel through a fluid coupling for the transmission of power therebetween;
   (c) a one-way clutch means;
   (d) an on-off clutch means connected in series with said one-way clutch means, said serially connected clutch means being disposed side-by-side in a space defined between opposed inner walls of said pump wheel and said turbine wheel for connection between said pump wheel and said turbine wheel; and
   (e) means for operating said on-off clutch means, wherein when said on-off clutch means is engaged and said one-way clutch means is engaged, said turbine wheel is mechanically coupled to said pump wheel for the transmission of power thereto.

2. A hydraulic torque converter as set forth in claim 1, wherein said one-way clutch means comprises:
   (a) an annular drive means connected to said pump wheel;
   (b) an annular driven means mounted radially inward with respect to said drive means, said driven means being coupled to said turbine wheel through said on-off clutch means; and
   (c) a wedge roller interposed between said drive means and driven means for transferring power only from the drive means to the driven means.

3. A hydraulic torque converter as set forth in claim 2, wherein said on-off clutch means is a multiple disc friction clutch.

4. A hydraulic torque converter as set forth in claim 3, wherein said on-off clutch means comprises:
   (a) a plurality of drive friction plates connected to said driven means of said one-way clutch means;
   (b) a plurality of driven friction plates connected to the inner wall of said turbine wheel, said driven friction plates and said drive friction plates overlapping each other;
   (c) a hydraulic chamber formed in the inner wall of said hydraulic torque converter; and
   (d) a piston slidably fitted into said hydraulic chamber, said piston pushing said drive friction plate to thereby slide said drive friction plate relative to said driven member into a frictional engagement with said driven friction plate, in response to the increase in pressure in said hydraulic chamber.

5. A hydraulic torque converter as set forth in claim 4, wherein said drive friction plates are splined to said driven means and said driven friction plates are splined to the inner wall of said turbine wheel.

6. A hydraulic torque converter as set forth in claim 1, wherein said means for operating said on-off clutch means comprises a speed change control circuit, and wherein the switching of said control circuit to a high speed state causes the engagement of said on-off clutch means.

* * * * *